Oct. 1, 1935.                C. C. KESTY                2,015,681
        METHOD OF AND APPARATUS FOR MAKING HOLLOW CERAMIC WARE
                    Filed Oct. 22, 1932        3 Sheets-Sheet 1
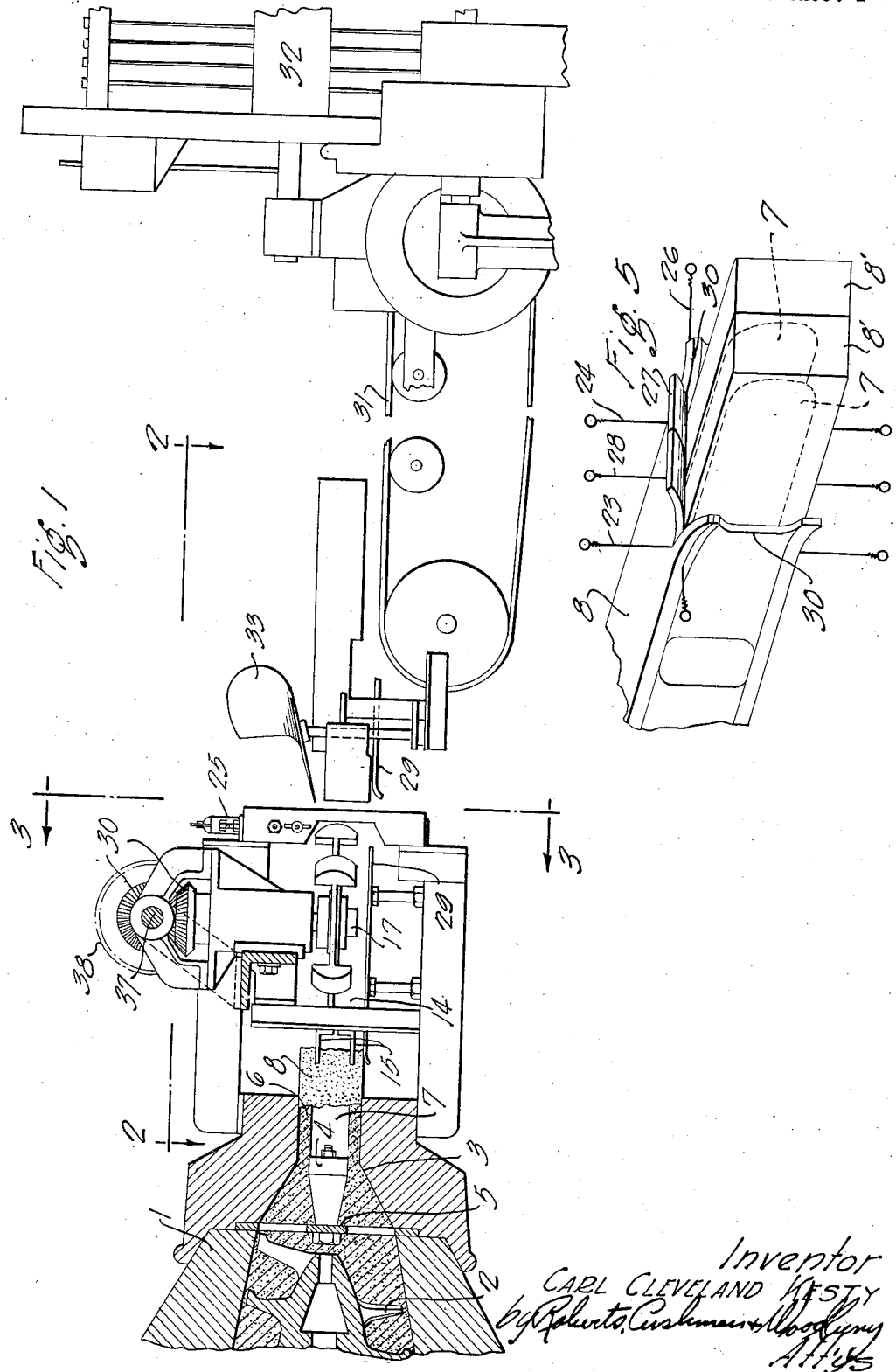

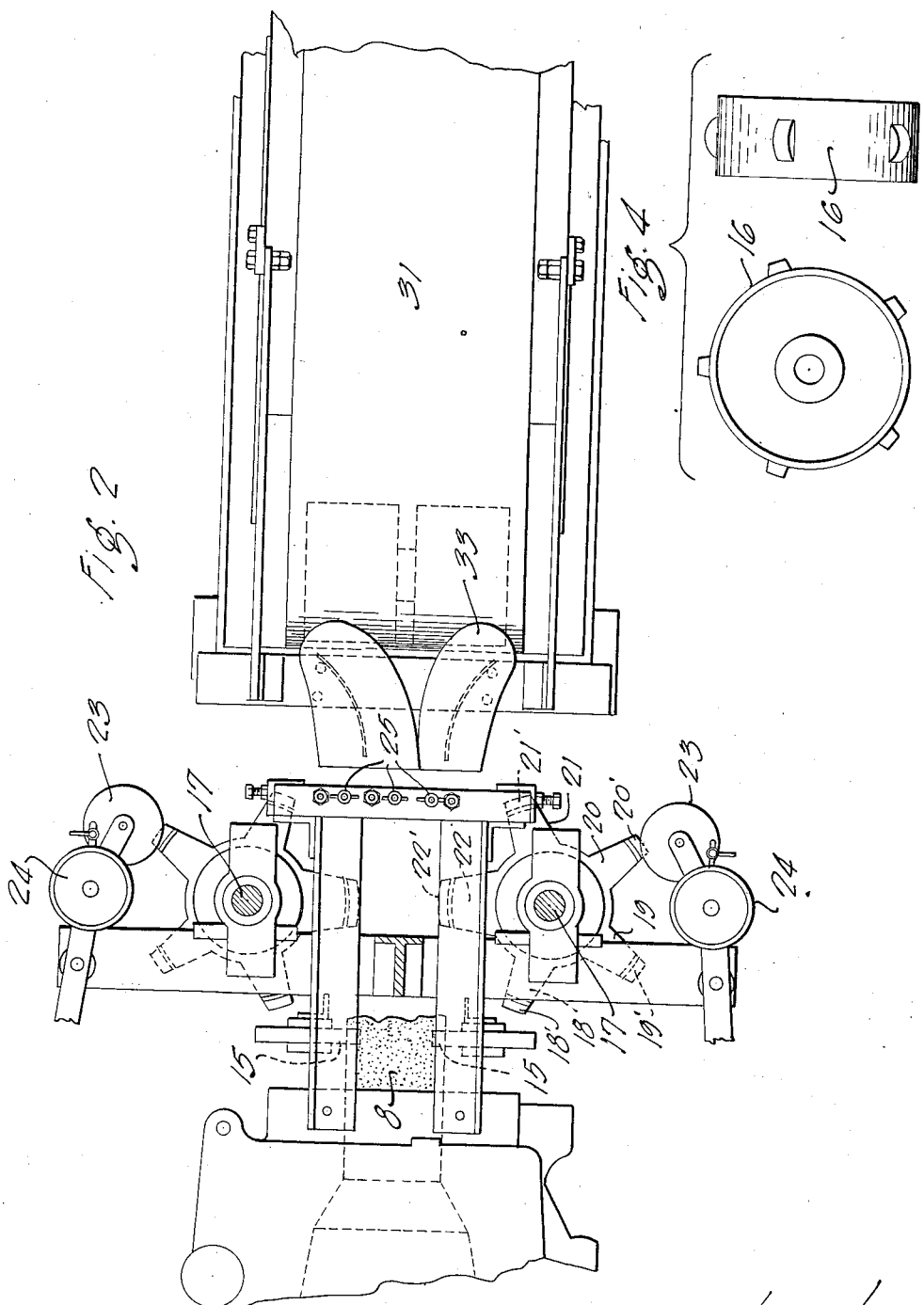

Oct. 1, 1935. C. C. KESTY 2,015,681
METHOD OF AND APPARATUS FOR MAKING HOLLOW CERAMIC WARE
Filed Oct. 22, 1932 3 Sheets-Sheet 3
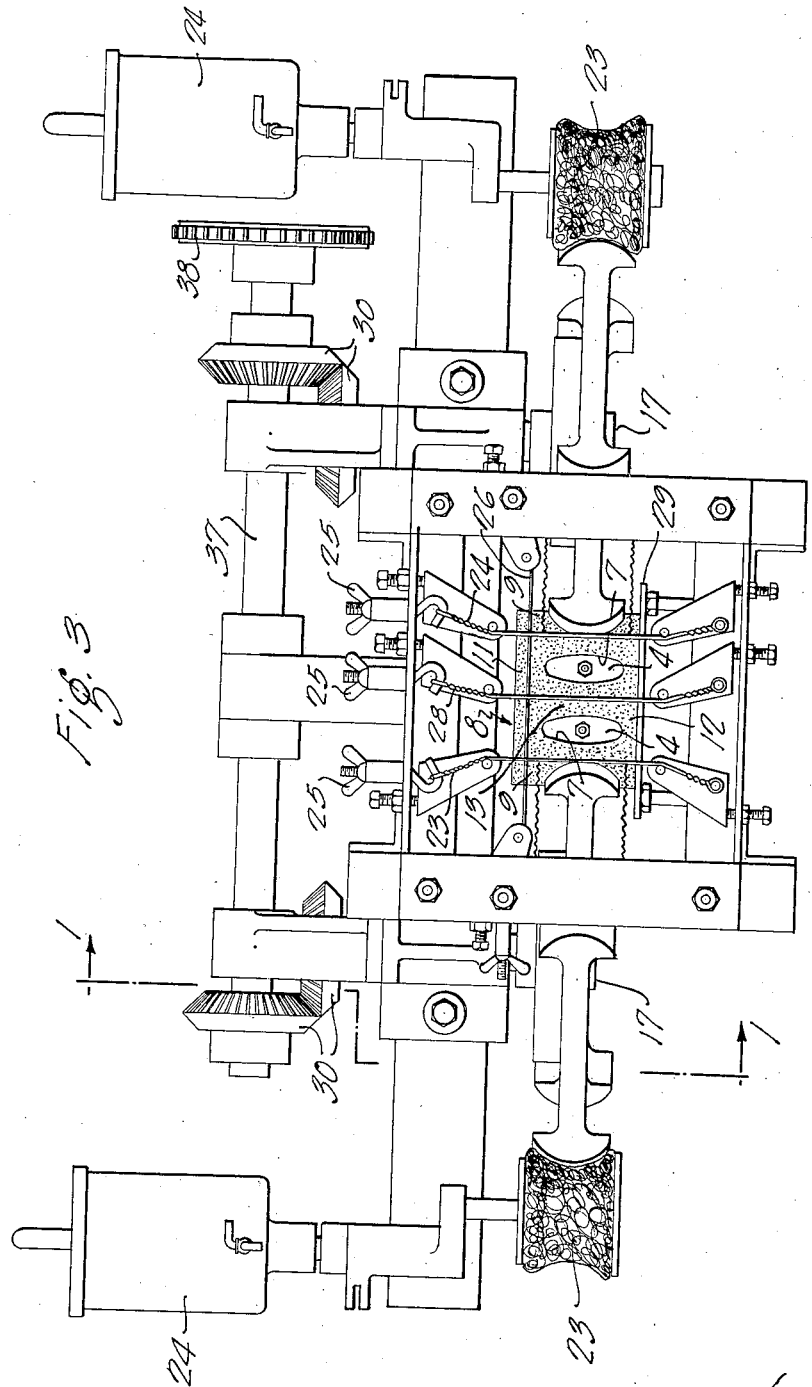
Inventor
CARL CLEVELAND KESTY
by Roberts, Cushman & Woodberry
Attys Patented Oct. 1, 1935

2,015,681

UNITED STATES PATENT OFFICE 2,015,681

METHOD OF AND APPARATUS FOR MAKING HOLLOW CERAMIC WARE

Carl Cleveland Kesty, Bloomsburg, Pa., assignor, by mesne assignments, to Empire Trust Company, New York, N. Y., a corporation of New York, as trustee Application October 22, 1932, Serial No. 639,083

21 Claims. (Cl. 25—17)

This invention relates to lightweight, hollow ceramic ware, such as building brick, and to a method and apparatus for making the same.

In the ceramics art, it has always been a problem to manufacture hollow ware with an interior cavity, which would be completely closed and not show any evidence of its hollow characteristics on the exterior. Hollow ceramic ware has been made, but the procedure for effecting this result has been either by (1) casting a fluid ceramic slip in the interior surface of a mold; (2) by assembling previously molded walls or sections and joining them together by pressure or by the application of a slip or plastic composition along the lines or surfaces of intended contact; or (3) by molding the plastic clay about an object of combustible composition which, upon firing the mass in the kiln, is decomposed, leaving an ash and a hollow space in its stead. Such procedures are obviously difficult and clumsy, and experience goes to show that they are not applicable commercially except for very special products, in which necessity rules in spite of the excessive expense and labor which they involve. Moreover, the products obtained thereby contain defects of structure and/or composition which seriously limit the uses to which they may be put and their dependability for continued service.

It is therefore an object of this invention to provide a method of making hollow ceramic ware of the usual kinds (including those which command a relatively low price such as building brick), which shall be applicable on a large scale of operations and commercially economical of labor, materials, and equipment. It is a further object to provide hollow ceramic articles in which the cavity is completely enclosed, without showing any evidence of its hollowness on the outside and which shall nevertheless be strong and serve substantially the same purposes as if it were solid, while being of improved characteristics in many respects, such as uniformity of structure and composition. It is a further object to provide apparatus for automatically shaping such hollow ware, with uniformity. Other objects will appear from the following disclosure.

The method of the invention includes, generically, the preliminary shaping (as by extrusion) of a column of a plastic ceramic composition, such as clay, having one or more cores or open spaces running longitudinally within the column, and periodically indenting the side wall or walls of the plastic column so as to close the longitudinal core spaces (or spaces). Upon cutting the column transversely through successive indentations thus formed, a series of hollow (but completely or substantially completely enclosed) shapes of plastic clay will be produced. These hollow shapes are further shaped and finished to the required (green) dimensions followed by drying and firing in a kiln, according to the known procedures of the ceramic arts, to produce a finished product of corresponding properties and characteristics.

Such supplementary conformation of the column may be effected, for example, by cutting from the outer walls a layer of sufficient thickness, either partially or completely to remove the indentations and leave slight indentations or substantially unbroken, sharply defined surfaces and margins in the column accordingly. Likewise, when the column contains several longitudinal core spaces, it may be cut longitudinally of the walls, between such hollow cores, thus producing a plurality of similar hollow columns (each having one or more longitudinal core spaces) periodically closed transversely to form longitudinal series of closed sections, which may subsequently be cut apart, if and as required. Thus, the column may be cut at each indentation or at alternate indentations. In the latter case each section will contain a cross wall corresponding to the indentation which has not been cut and thus resemble two bricks, for example, but in fact comprise a single unit.

In order to reinforce the individual units, in this manner (such as single bricks, for example) especially when thin walls are desired,—the column of plastic material may be indented either part way or completely intermediate of the indentations at which the column is to be cut transversely. In this way reinforcements are introduced across the longitudinal core or cavity which serve to form a closure with the side walls and also act as reinforcing inner partitions or arch ways in each finished shape. By then cutting a layer of clay from the outer wall, as above described, the walls of the finished brick will form continuous plane surfaces such as are presented by solid bricks as usually made.

A preferred and representative example of carrying out my invention in actual practice will be described in its application to the commercial manufacture of lightweight, hollow, building brick, reference being made to the accompanying drawings, in which:

Fig. 1 is a side view and cross section of a complete apparatus for making bricks (with supplemental apparatus indicated for cutting them apart);

Fig. 2 is a plan view and cross section of the same in the plane 2—2 of Fig. 1;

Fig. 3 is an end view of the same, in the direction of the arrows in the plane 3—3 of Fig. 1;

Fig. 4 is a detail view of a modified form of the indenting unit and of the mounting therefor; and Fig. 5 is a diagrammatic representation, in perspective of the end of the clay column as it is cut to the required shapes and dimensions.

Other equipment designed for indenting the side walls, differing in the specific shape and mode of operating the plunger, such as reciprocating plungers, in place of rotating plungers and operated by suitably designed cams or similar device, are contemplated but not herein illustrated.

In the actual practice of the invention for the manufacture of building bricks, for example, the raw clay is prepared and mixed with water in suitable proportions to develop the required degree of plasticity. For this purpose, using Milton or Darlington (Pennsylvania) shale, the following proportions have been advantageously employed:

| | Lbs. |
|---|---|
| Clay | 90–95 |
| Water | 10–5 |

The mixture is first worked in a pugging mill or otherwise to develop uniformity and the necessary consistency and/or plasticity and then supplied to the auger machine, as indicated at 1, which has a spiral worm 2, driven by suitable power means, not shown, and tending to render the mixture uniform and to feed it continuously and under pressure through a forming die 3. In the present instance, the die 3 has an aperture of rectangular cross section, corresponding to the endwise section of two bricks, but of somewhat greater dimensions for reasons which will be described below. Mounted in the forming die 3 are two cores 4, 4 (shown as oval in the instant case, which is especially effective but may be otherwise shaped and proportioned if desired) which are spaced apart and from the walls of the dies by a spider or core bridge arrangement 5 which is mounted in the walls of the die and adapted to present a minimum of resistance to the passage of the plastic clay column 6 therethrough and to permit the healing of the clay column after flowing around the same. Any convenient means may be provided to introduce air either by suction or pressure to fill the space formed behind the advance column of clay 6 as is well known and practiced in the art. In this way a rectangular column of plastic clay is provided, having two parallel longitudinally hollow core spaces 7, 7 therein corresponding substantially in cross-sectional shape and dimensions to the shape and dimensions of the cores 4, 4. The hollow column 8, which is thus formed as it leaves the die 3, is somewhat wider than the thickness of two bricks (see Fig. 3)—the excess being equally divided between the thickness of the outer side walls 9, 9 of the column. The height of the clay column 8 may also be somewhat greater than that required for a green brick and the core spaces 7, 7, may be spaced somewhat farther from the top of the column in such cases, leaving a wall thickness at the top 11, in excess of that at the bottom 12. In the middle of the column 8, the core spaces are separated by a partition or wall of clay 13, which is approximately equal to the combined thickness desired for the inner walls of the brick to be shaped therefrom (Fig. 5).

The hollow rectangular column of clay 8 as thus extruded from the die 3 may pass through chamber 14, and retaining walls (not shown) may also be provided at this point, to maintain the shape and dimensions of the clay column, if desired.

It is also found advantageous, though not absolutely essential, to score the side walls of the plastic column of clay in a line or lines, adjacent to the areas of the walls which are subsequently to be indented as hereinafter described. For this purpose blades or wires 15 are mounted on each side of the column and protrude into its path to a depth sufficient to cut or score the clay as may be required—but usually not sufficient to leave a mark on the finished product which is to be fashioned therefrom. Such scoring permits the clay to be indented without drawing in the surface layer or skin from beyond this line.

Mounted on each side of the clay column, as it is thus being extruded from the die 3, by the auger machine, is a vertical shaft 17 carrying a plurality of radial arms 18, 19, 20, and 21 which are evenly spaced apart and carry curved rams or plungers 18', 19', 20', 21' at their outer ends. A fifth arm 22 with plunger 22' of somewhat greater width than the others and equally spaced therefrom may also be provided. The curvature of these rams or plungers may correspond to the curvature of the hollow core of the clay column and be so shaped as to reduce relative movement of the clay in the column to a minimum. As shown the plungers may be mounted on the ends of radial arms or, as shown in Fig. 4, may have a cam surface 16 which contacts with or bears against the side walls of the clay column intermediate of the indentations. They may also advantageously come into contact, as they revolve, with a soft roller 23 of waste or the like, which is moistened with lubricating oil from tank 24 by regulating the petcock thereon.

The two drive shafts 17, are connected and driven through the mitre gears 30 and shaft 31 which is in turn driven through the sprocket and chain 38 (Fig. 3) coupled to a similar sprocket on the drum of the cam shaft of the cutter 32, so as to be rotated in the direction of the moving column of clay, and in time with the revolution of the cutter. The rams or plungers 18', 19', 20', 21' successively engage and press in the side walls of the clay column, preferably forming indentations of a sufficient depth, so that the hollow core space at such points is completely closed. The excess thickness of clay in the outer walls, as above noted, is preferably sufficiently great so that the bottoms of the indentations thus formed are not within the dimensions of the brick ultimately to be shaped therefrom. (See Fig. 5). Hence the clay column as it advances (Fig. 3) may have the excess of clay in the side walls 9 removed as by the vertical cutting wires 23, 24, (tightened and held in alignment by wing nuts 25) without leaving any irregularities in the remaining side walls of the clay column which are to form the flat surfaces of the finished brick.

A third horizontal wire 26 cuts the texture on the face of the brick by removing an excess layer of clay 27 from the top of the column, while a central, vertical wire 28 cuts the clay column in two, midway between the hollow core spaces 7, 7.

The two separate columns of clay 8', 8' as thus formed, slide over supporting surfaces 29 onto a belt conveyor 31 (usually called a timing belt) and are thence carried to the cutter 32.

The strip of clay 27 cut from the upper part of the column by the horizontal cutting wire is caught up by the curved blade 33 which lifts it and diverts it to one side where it may fall upon a conveyor (not shown) and returned to the auger machine. Likewise the layers of clay 30, 30, cut from either side of the clay column by the vertical wires may be similarly returned and reused.

The hollow columns of plastic clay 8', 8' of cross sections accurately corresponding to the cross sections of molded green, unburned bricks and in which the hollow cores are closed at intervals corresponding to the lengths of the (green, unburned) bricks, are next conveyed to the cutter 32. The cutter, which is indicated but not described or illustrated in detail, is a standard cutter which is well known to the art of clay manufacture. The cutter in this instance, is designed to cut five standard brick by each third of a revolution of the cutting reel, the standard cutting wires employed being spaced at proper intervals. The length of travel is so arranged that the clay column on the cutter platens is always approximately two inches longer than the total length of five bricks, to allow a short piece of waste each time and insure all bricks being of the proper length. This excess of material is provided for by making the plunger or ram 22' of greater width than the others as noted above, which makes the corresponding indentation or closure at such point much wider, longitudinally of the column, than the other rams or plungers.

The other well known types of cutting reels may be used and the design of the indenting plungers will depend on the length and number of bricks to be cut per stroke of the cutter, the thickness of closure required at or between the cut ends, etc.

The molded and shaped bricks, as thus brought to standard dimensions, are delivered again to an off-take belt, not shown, and may subsequently be dried and fired in the customary manner, except that less time and less fuel may be required than for drying and burning bricks made in accordance with the usual practices of the art.

The bricks, as thus shaped, substantially correspond in appearance and other properties to the usual molded bricks of solid clay, but have a hollow core and consequently are of much lighter weight. Having less clay material they also contain less water and hence may be dried more promptly and fired to develop a higher degree of vitrification and strength in the same time or in a shorter time than a solid brick which has been made in the usual way and which has heretofore been customarily employed.

While a core space of oval cross section, as above described, presents notable advantages in providing an arch-shaped inner wall surface (which is rendered continuous by the closure at the ends) it will be obvious that the size and shape of the cross section of the hollow core of the column may be changed substantially at will, corresponding to the shape of the core used in the die. Also, the cross-sectional shape of the clay column itself need not be rectangular, as in the manufacture of brick, but may be of other shapes such as circular or oval,—and may correspond to the cross section of a single brick or of a plurality of bricks (e. g. more than two).

Again, in the manufacture of bricks, the bricks need not necessarily be end-cut but may be side-cut, if desired,—although in such cases the hollow core would tend to constitute a lower proportionate volume of the brick and the formation of scrap to be returned would be increased somewhat.

It may also be noted that whereas in the above description the bricks are to be cut apart at each indentation formed by the rams or plungers 18', 19', 20', 21', 22',—it may in some instances be desirable to indent and close (or partially close) the plastic column of clay at closer intervals. In this way, by cutting the column at every other indentation, for example, each brick (or other individual shape) will be closed at the ends but will also contain a hollow core which has been substantially closed or double arched at one or more intervals in the body portion of the brick. This will produce a brick or other shape which, though not perhaps so light in weight, will be greatly reinforced by the arches of the inner cross wall or walls of clay thus formed. This may at the same time permit the outer walls to be made somewhat thinner than would otherwise be possible, without appreciable decrease in strength or in the freedom from breakage by handling, etc., of the raw bricks, preliminary to firing or during or after being burned in the kiln.

In such cases it may also be desirable to adjust the relative lengths of the plunger so that the depth to which they indent the clay column at the points where it is to be cut apart is less than at intermediate points. Then, when the surplus clay is trimmed from the side walls it will completely remove the indentations adjacent to the ends of the bricks but will leave a slight indentation in the walls of the trimmed brick adjacent to the intermediate points at which the clay has been indented to close or partially close the core. Such slight indentations which are then left in the side of the bricks serve partly to lighten the weight of the bricks and also partly to provide an improved engagement of the bricks with one another and with the mortar, in the subsequent laying up of the finished, burned bricks.

I claim:

1. Method of making lightweight ceramic ware comprising the steps of shaping plastic ceramic material into the form of a hollow column, indenting the column at spaced intervals to close the longitudinal core space therein, shaping the column thus produced to the required dimensions, and cutting the same at said indentations.

2. Method of making lightweight ceramic ware comprising the steps of shaping plastic ceramic material into the form of a hollow column, indenting the column at spaced intervals to close the longitudinal core space therein, and cutting the same at said indentations.

3. Method of making lightweight ceramic ware comprising the steps of shaping plastic ceramic material into the form of a continuous hollow column, indenting the column at spaced intervals to close the longitudinal core space therein, shaping the column thus produced to the required dimensions, and cutting the same at said indentations.

4. Method of making lightweight ceramic ware comprising the steps of shaping plastic ceramic material into the form of a hollow column of greater cross section than ultimately desired, indenting the column at spaced intervals to close the longitudinal core space therein, shaping the column thus produced to the required dimensions, and cutting the same at said indentations.

5. Method of making lightweight ceramic ware comprising the steps of shaping plastic ceramic material into the form of a hollow column of greater wall thickness than ultimately desired, indenting the column at spaced intervals to close the longitudinal core space therein, shaping the column thus produced to the required dimensions, and cutting the same at said indentations.

6. Method of making lightweight bricks comprising the steps of shaping plastic ceramic material into the form of a hollow column, indenting the column at spaced intervals to close the longitudinal core space therein corresponding to the dimensions of the bricks to be made, shaping the column thus produced to the required dimensions, for green, unfired bricks, and cutting the same at said indentations.

7. Method of making lightweight ceramic ware comprising the steps of shaping plastic ceramic material into the form of a hollow column of greater cross section than ultimately desired, indenting the column at spaced intervals, to close the core space, shaping the column thus produced to the required dimensions, and cutting the same at certain of said indentations, to form closed ends and leaving closures in the ware intermediate of the ends.

8. Method of making lightweight ceramic ware comprising the steps of shaping plastic ceramic material into the form of a hollow column of greater cross section than ultimately desired, indenting the column at spaced intervals, sufficient to close the core space with the excess plastic material adjacent thereto, shaping the column thus produced to the require dimensions, and cutting the same at said indentations leaving a closed end.

9. Method of making lightweight ceramic ware comprising the steps of shaping plastic ceramic material into the form of a hollow column, indenting the column at spaced intervals, thereby closing the column with excess of plastic from one side of the column, shaping the column thus produced to the required dimensions, and cutting the same at said indentations.

10. Method of making lightweight ceramic ware comprising the steps of shaping plastic ceramic material into the form of a hollow column, indenting the column at spaced intervals to close the core space with excess of plastic material from opposite sides of the column, shaping the column thus produced to the required dimensions, and cutting the same at said indentations.

11. Method of making lightweight ceramic ware, comprising the steps of shaping plastic ceramic material into the form of a column having a plurality of core spaces running longitudinally thereof, indenting said column at spaced intervals to close the core spaces therein with an excess of plastic material from the walls of the column, and cutting the same at said indentations.

12. Method of making lightweight ceramic ware comprising the steps of shaping plastic ceramic material into the form of a column having a plurality of core spaces running longitudinally thereof, indenting said column at spaced intervals to close the core spaces therein with an excess of plastic material from the walls of the column, and cutting the same at said indentations and cutting said column longitudinally intermediate said core spaces.

13. Apparatus for making hollow ceramic ware, comprising means for extruding a column of plastic ceramic material having a longitudinal core space therein and means for indenting the side walls of the column at spaced intervals substantially to close said core space.

14. Apparatus for making hollow ceramic ware, comprising means for extruding a column of plastic ceramic material having a longitudinal core space therein and means for indenting the side walls of the column at spaced intervals substantially to close said core space and means for shaping the column to predetermined dimensions.

15. Apparatus for making hollow ceramic ware, comprising means for extruding a column of plastic ceramic material having a longitudinal core space therein and means for indenting the side walls of the column at spaced intervals, substantially to close said core space and means for cutting said column transversely in the indentations thus made.

16. Apparatus for making hollow ceramic ware comprising means for extruding a column of plastic ceramic material having a longitudinal core space therein and means for indenting the side walls of the column at spaced intervals, substantially to close said core space and means for shaping the column to predetermined dimensions and means for cutting said column transversely in the indentations thus made.

17. Apparatus for making hollow ceramic ware comprising means for extruding a column of plastic ceramic material having a plurality of longitudinal core spaces therein, and means for periodically indenting the side walls of the column, substantially to close said core spaces.

18. Apparatus for making hollow ceramic ware comprising means for extruding a column of plastic ceramic material having a plurality of longitudinal core spaces therein, and means for periodically indenting the side walls of the column, substantially to close said core spaces and means for cutting the column transversely in the indentations.

19. Apparatus for making hollow ceramic ware comprising means for extruding a column of plastic ceramic material having a plurality of longitudinal core spaces therein, and means for periodically indenting the side walls of the column, substantially to close said core spaces and means for cutting the columns longitudinally between said core spaces.

20. Apparatus for making hollow ceramic ware comprising means for extruding a column of plastic ceramic material having a longitudinal core space therein, means for scoring the side walls, and means for indenting the side walls of the columns at spaced intervals substantially to close said core space.

21. Method of making lightweight ceramic ware, comprising the steps of shaping plastic ceramic material into the form of a hollow column, scoring the column and indenting the column at intervals adjacent to said scoring thereby closing the core space with plastic material of the column wall.

CARL CLEVELAND KESTY.